United States Patent [19]
Condolios

[11] 3,762,651
[45] Oct. 2, 1973

[54] AGRONOMIC IRRIGATION DEVICE
[75] Inventor: Elie Condolios, Grenoble, France
Berges, Grenoble, France
[73] Assignee: Societe Grenobloise d'Etudes et d'Applications Hydrauliques (Sogreah), Grenoble, France
[22] Filed: Jan. 17, 1972
[21] Appl. No.: 218,436

[30] Foreign Application Priority Data
Jan. 20, 1971 France ..................... 7102563

[52] U.S. Cl. ................ 239/468, 239/542, 239/550
[51] Int. Cl. ............................................. B05b 1/34
[58] Field of Search .................. 239/266, 466, 468, 239/542, 547, 550

[56] References Cited
UNITED STATES PATENTS
| 921,205 | 5/1909 | Cramer | 239/542 X |
| 2,716,574 | 8/1955 | Chase | 239/547 |
| 2,550,573 | 4/1951 | Lyman | 239/468 |
| 2,659,631 | 11/1953 | Wilmes | 239/468 |

FOREIGN PATENTS OR APPLICATIONS
624,196  5/1949  Great Britain ..................... 239/550

Primary Examiner—M. Henson Wood, Jr.
Assistant Examiner—John J. Love
Attorney—John J. Hart et al.

[57] ABSTRACT

The pipes in an irrigation network are provided with a plurality of dripper watering devices, one for each plant and each having a first cylindrical chamber with a conical base and into the upper part of which the water is fed tangentially from the pipe to which the device is connected through a calibrated orifice. The water is discharged from such chamber through an axial, calibrated orifice at the bottom of the conical base thereof and into a second cylindrical chamber having at its bottom an irrigation water delivery orifice.

Figure 3:
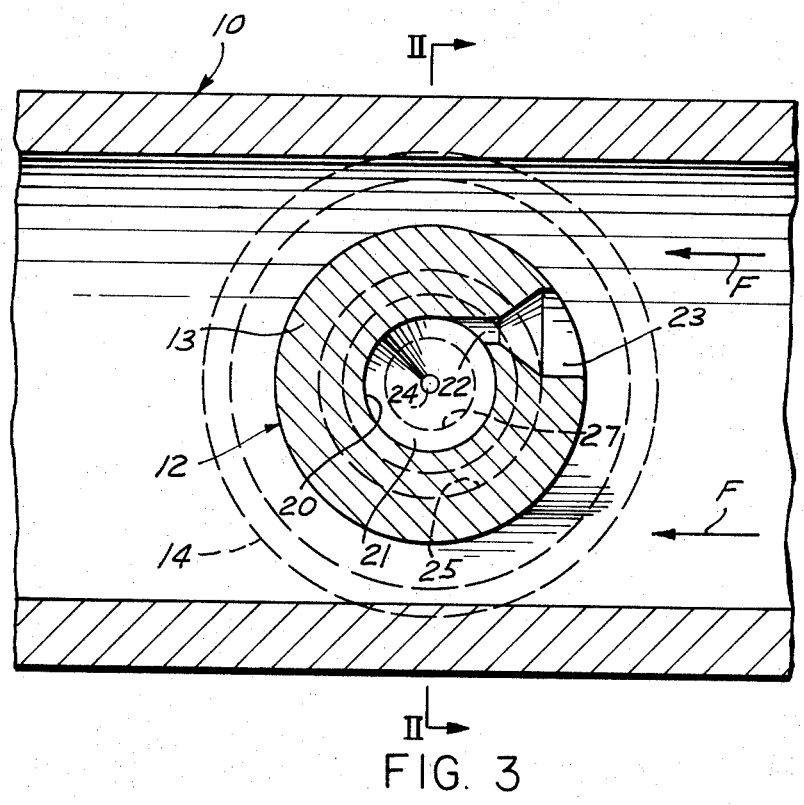

8 Claims, 3 Drawing Figures 3,762,651

AGRONOMIC IRRIGATION DEVICE

THE INVENTION

This invention relates generally to dripper watering devices such as are used in the irrigation of agronomy cultivated areas.

Areas of the indicated type are frequently irrigated by watering systems which supply water to the ground in a slow flow or by sprinkling. Conventional systems of this form usually supply substantially larger quantities of water than what is taken in by the plants being irrigated and are consequently very wasteful and expensive in operation.

A more modern kind of irrigation, called "dripper irrigation" makes it possible to provide sufficient water for the needs of each plant or tree being irrigated without delivering water to ground which is not occupied by the roots of the plants being watered. With the use of such systems, therefore, the consumption of water can be considerably decreased and consequently also the cost of irrigation.

In order to obtain the desired effects with known dripper irrigation systems, it is necessary to design and lay a system of pipes on the land to be irrigated that is suited to the purpose in mind. Usually the main pipes supply water to secondary pipes which follow the rows of the plants or trees to be irrigated. Connected to the secondary pipes at the foot of each plant to be irrigated, are devices which distribute the water drop by drop to the plant so that the water flow through the soil forms a globular humid mass around the roots of the plant. The degree of humidity to be created in each of these masses depends upon local climatic conditions and the plant's growth needs. Devices of this type are usually designed to supply water at the constant rate of between 4 and 10 cu. dm/hour to each plant when the water pressure on the irrigation network is between 0.5 and 1.5 bars.

The aforesaid known dripper distribution devices operate at a low flow rate and usually a hydraulic flow of the laminar type is employed. With this kind of flow, the output rate of each device is proportional to its own input pressure. Thus, in the case of two devices of this kind, if the input pressure of one is twice that of the other, the output of the two devices will also vary by 100 percent. Since the water pressure is a direct function of the output of these devices, if the plants to be irrigated are on flat land, the feed pressure to each device, being reduced only by the loss of head within the supply piping, will be almost the same, and the water supplied by the devices to the plants will be the same. However, if the plants to be irrigated are located on undulating ground so that they are set at different levels, even though a constant feed pressure of water, say between 0.5 and 1.5 bars, is supplied to the irrigation network, the pressure on each distributor device will differ very considerably. As a consequence, the outputs of the devices will also differ very considerably, with certain of the plants receiving a surplus of water and other plants receiving insufficient water. In an effort to remedy this situation, some layouts of supply piping on undulating terrains have been designed to reduce to a minimum the pressure differences between the differently located distributor devices, but for economic reasons the differences of pressure at the inputs of such devices in many systems are not eliminated.

The primary purpose of the present invention is to provide an irrigation system in which the outputs of the dripper distributor devices are substantially independent of the pressure of the water supplied thereto.

The aforesaid purpose is attained by devising a dripper watering device which converts the water input from the system into a turbulent flow and then breaks up such flow so that the water leaves the device slowly, drop-by-drop. The device is formed to provide an initial cylindrical chamber having a conical base, and into the upper part of which is fed tangentially through a calibrated orifice the water supplied through an irrigation pipe. As a result of this construction there will be set up in the chamber a very violent turbulent movement which makes it possible to obtain a turbulent flow at all times. Such flow is established continuously and at high speed through a second orifice located at the bottom of the conical base of the chamber and leading into a second cylindrical chamber situated directly below the initial, or first mentioned chamber. The high speed turbulent flow discharging through the second orifice is broken-up in the second chamber and leaves the latter slowly, and drop-by-drop, through a third orifice at the base of this second chamber. It has been found that by thus converting the laminar flow of the pipes into a turbulent flow in accordance with the invention, it is possible to obtain a more uniform distribution of output with less dependence on the pressure of the input. In fact, measurements made during tests of devices embodying the invention, showed that pressure is a function of 2.5 of the flow, i.e., if the pressure varied 100 percent, the output would only vary 33 percent, as against the 100 percent variation in conventional equipment previously pointed out.

Figure 1:
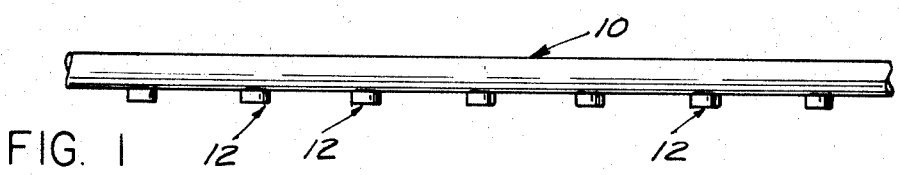
Figure 2:
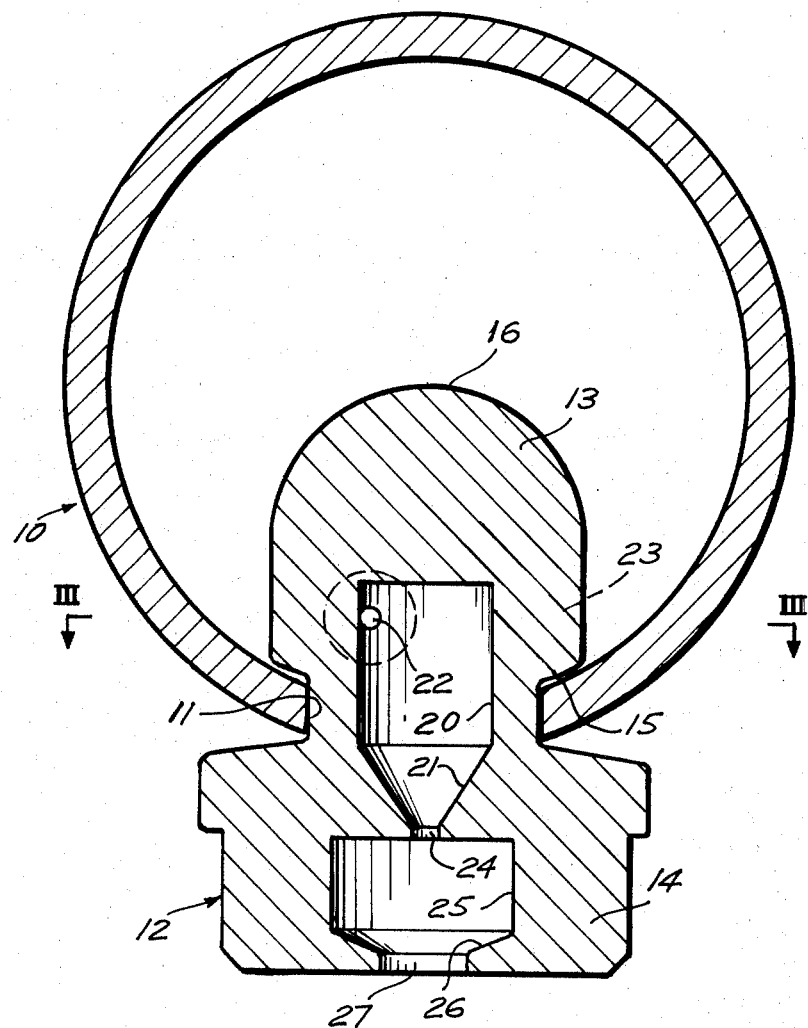

It is believed that a better understanding of the advantages and novel characteristics of the invention will be obtained from a perusal of the following description of a preferred form of dripper device embodying the invention, when read in connection with the accompanying drawings, in which FIG. 1 is a plan view of a portion of an irrigation pipe fitted with the dripper watering devices of this invention;

FIG. 2 is an enlarged vertical sectional view of the device taken along the line II—II in FIG. 3 and showing the pipe in transverse vertical section; and FIG. 3 is a transverse sectional view taken along the line III—III of FIG. 2.

The pipe 10 shown in FIG. 1 forms part of a conventional dripper irrigation network for watering a cultivated area of ground provided with rows of spaced plants. As is indicated by the portion of the pipe 10 shown in FIG. 1, such pipe and others in the network are fitted with dripper watering devices 12 for providing a low water output at the foot of each plant in the row along which such pipe extends. The pipe 10 may be made of any suitable material such as metal, plastic materials, natural or synthetic rubber materials, etc. The pipe material may be flexible and resilient and a row of holes 11 may be provided therein for reception of the devices 12. As shown in FIG. 2 the inner or inlet portion 13 of each device 12 may be separated from the projecting or outlet portion 14 thereof by an annular groove 15 for receiving the edge of an opening 11 in the pipe. The inner end 16 of the device may be configured to enable the inlet portion 13 of the device 12 to be inserted through the pipe hole 11 and the groove 15 may be made with a slightly larger diameter than that of the hole 11 so that the device can be fitted directly to the pipe with a good seal capable of taking care of the usual water pressures employed in the use of the pipes.

The device 12 may be made of any suitable material and, as illustrated, may be molded in the form of a single integral mass. Formed within the unitary mass of material constituting the device 12 is a cylindrical chamber 20 provided with a conical base 21. The axis of chamber 20 is radially disposed to the longitudinal axis of the pipe 10 and extends through the center of the opening 11 in which the device 12 is fitted. The cylindrical portion of chamber 20 has a diameter of between 2 and 8 mm. and is located in both the inlet portion 13 of the device and the region of the device defined by the groove 15. The conical base 21 of chamber 20 is positioned in the upper part of the outlet portion 14 of the device. Provided at the upper end of chamber 20 is a calibrated orifice 22 of about from 0.1 to 1 mm. in diameter and formed to discharge water flowing through the pipe 10 in the direction of the arrows F in FIG. 3, tangentially into the chamber 20. The water from the pipe 10 enters the orifice 22 through an enlarged forward hole 23 which facilitates the entry of the flow of water from the pipe 10 into orifice 22. The water entering chamber 20 is discharged therefrom through an orifice 24 provided at the lower reduced end of the conical base 21 of chamber 20.

It has been found that the irrigation water supplied through the pipe at the customary pressure of between 0.5 and 1.5 bars escapes through the calibrated orifice 22 at a very high speed. By reason of the fact that the orifice 22 discharges this high speed water jet tangentially into the upper part of the chamber 20, there is set up in such chamber a very violent turbulent movement, which despite the small size of chamber 20, provides at all times a source of turbulent flow of irrigation water through the orifice 24. Further, this turbulent movement created in chamber 20 produces in such chamber a central depression of the liquid flow which compresses the liquid against the inclined wall of orifice 24, thereby considerably reducing the output from this orifice and making such output less dependent upon the pressure of the water in pipe 10.

The turbulent flow passing through orifice 24 enters axially into the top end of a cylindrical chamber 25 located in the outlet portion 14 of the device. The chamber 25 has a central axis which is aligned with that of chamber 20 and has at its lower end a shallow conical base 26 which leads to a discharge orifice 27 formed at the reduced bottom end of such base. The axial length of chamber 25 is less than that of chamber 20, but the diameter of the cylindrical portion thereof is greater than that of the chamber 20. As a result of this construction the turbulent flow passing through orifice 24 is broken down and the water coming from chamber 20 is caused to leave the cylindrical chamber 25 slowly, drop-by-drop through the orifice 27 at its base. It has been found that if the sizes of the orifices 24 and 27 in the devices fitted to a pipe 10 are between 0.3 mm. and 1 mm. there is produced by each device a desired output of about 4 to 10 cu. dm/hour even though the devices fitted to such pipe are at different elevations. An output flow within this range will provide a satisfactory supply of water to all of the plants serviced by such pipe.

What is claimed is:

1. A water dripper device comprising a first cylindrical chamber completely closed but for an inlet opening and an outlet opening, said chamber having at one end a conical portion provided at the reduced end thereof with an axial water escape orifice, and said chamber being provided at its other end with a small inlet orifice capable of discharging a jet of water at high speed tangentially into such chamber so as to set up in the latter a turbulent movement such that the central portion of the water in such chamber is compressed against the chamber wall containing said escape orifice to such extent as to reduce the output of the latter, and a second cylindrical chamber completely closed but for an inlet opening and an outlet opening, said second chamber being axially aligned with said first chamber and in communication with the latter at one end thereof through said escape orifice, said conical portion containing said escape orifice guiding all the input from said inlet orifice, as a turbulent flow through said escape orifice, said second chamber being formed to break down the turbulent flow through said escape orifice and having at its other end a water delivery orifice through which the water in said chamber leaves slowly, drop-by-drop.

2. A water dripper device as defined in claim 1, in which said device has an inner upper part to be located within a water pipe and an outer lower part to project downwardly from such pipe, said first chamber being in said inner device part and communicatable with the interior of the pipe through said inlet orifice, said inlet orifice being located in the upper end portion of said inner part, said second chamber being located in said outer device part so that said delivery orifice is at the outer lower end of said outer part.

3. A water dripper device as defined in claim 2, in which said inlet orifice is disposed transversely to the longitudinal axis of said first cylinder, and has an enlarged entry end open to the water in the pipe.

4. The combination of a pipe and a water dripper device extending through the wall of said pipe so as to have an inner upper end located within the pipe and an outer lower end projecting downwardly beyond the wall of the pipe, said device comprising a first cylindrical chamber completely closed but for an inlet opening and an outlet opening, said chamber having at its outer lower end a conical portion provided at the reduced outer lower end thereof with an axial water escape orifice, and said chamber being provided at its inner upper end with a small inlet orifice bringing said chamber into communication with the interior of said pipe, said inlet orifice being formed to discharge water from the laminar flow thereof in said pipe tangentially into said chamber as a high speed jet so as to set up in the latter a turbulent movement, such that the central portion of the water in such chamber is compressed against the chamber wall containing said escape orifice to such extent as to reduce the output of the latter, and a second cylindrical chamber completely closed but for an inlet opening and an outlet opening, said second chamber being located in the outer lower end of said device and in communication with said first chamber at its inner upper end through said escape orifice, said conical portion containing said escape orifice guiding all the input from said inlet orifice as a turbulent flow through said escape orifice, said second chamber being formed to break down the turbulant flow through said escape orifice and having at its outer lower end a delivery orifice for delivering water therefrom slowly, drop-by-drop through the outer lower end of said device.

5. The combination defined in claim 4, in which the longitudinal axes of said first and second chambers are in alignment with the escape end delivery orifices thereof axially disposed, said longitudinal chamber axes being radially disposed to the longitudinal axis of the pipe, and said inlet orifice being disposed transversely to said longitudinal chamber axes.

6. A water dripper device as defined in claim 1, in which said inlet orifice has a diameter of about from 0.1 to 1.0 mm. and in which said first cylindrical chamber has a diameter of about from 2.0 to 8.0 mm.

7. A water dripper device as defined in claim 1, in which said first chamber has an axial length greater than the axial length of said second chamber, and a diameter less than the diameter of said second chamber.

8. A water dripper device as defined in claim 1, in which the diameters of said escape orifice and said delivery orifice are in the range of about from 0.3 mm. to 1.0 mm.

* * * * *